Oct. 11, 1927.
P. E. NORRIS
1,644,853
STORAGE BATTERY SEPARATOR
Filed Jan. 12, 1922
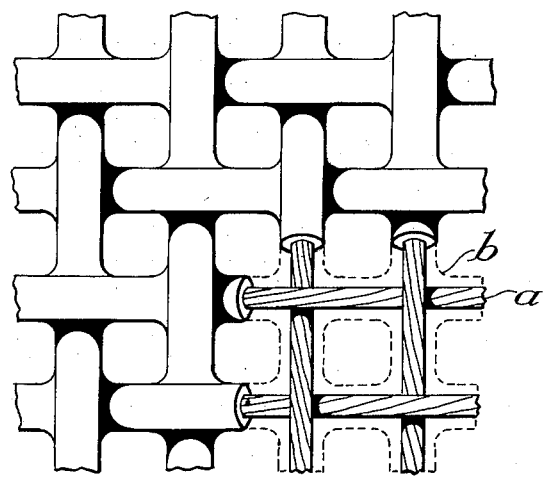
INVENTOR:
Paul E. Norris,
BY A. L. Vencill
His ATTORNEY Patented Oct. 11, 1927.

1,644,853

UNITED STATES PATENT OFFICE.

PAUL E. NORRIS, OF WILKINSBURG, PENNSYLVANIA, ASSIGNOR TO THE WESTINGHOUSE UNION BATTERY COMPANY, OF SWISSVALE, PENNSYLVANIA, A CORPORATION OF PENNSYLVANIA.

STORAGE-BATTERY SEPARATOR.

Application filed January 12, 1922. Serial No. 528,678.

My invention relates to storage battery separators, and has for an object the provision of a novel and improved separator member, as well as a process of manufacturing the same.

I will describe certain forms of separators, as well as processes of manufacturing the same, both embodying my invention, and will then point out the novel features thereof in claims.

Briefly described, a separator embodying my invention comprises a screen of insulating material, such, for example, as rubber or celluloid.

One process by which a rubber screen may be produced is to coat the individual strands of a sheet of fabric with rubber. The fabric may be of any suitable material, such, for example, as coarsely woven cotton, and the coating with rubber may conveniently be accomplished by dipping the fabric in a rubber solution and then vulcanizing or curing. The resulting product is a hard rubber screen, the apertures of which may be of any suitable area.

A celluloid screen may be produced by treating a fabric with such chemicals as are necessary to convert at least a portion of the fabric into celluloid.

A separator member embodying my invention may be used alone, or it may be a part of a composite separator including wood or other suitable material.

The accompanying drawing is a view showing on a greatly enlarged scale one form of separator embodying my invention.

In the drawing, the reference character *a* designates the threads of a suitable fabric such as coarsely woven cotton, and the reference character *b* designates the rubber or celluloid with which these threads are coated.

Although I have herein described only a few forms of separators, and only certain processes of manufacturing the same, both embodying my invention, it is understood that various changes and modifications may be made therein within the scope of the appended claims without departing from the spirit and scope of my invention.

Having thus described my invention, what I claim is:

1. A storage battery separator comprising a screen provided with an exterior coating of rubber which fills only a part of each aperture between the strands of such screen.

2. A storage battery separator comprising a fabric provided with an exterior coating of vulcanized rubber which fills only a part of each aperture between the strands of the fabric.

3. A storage battery separator comprising a fabric provided with an exterior coating of rubber which completely covers the strands but fills only a part of each aperture between the strands.

4. A storage battery separator comprising coarsely woven cotton provided with an exterior coating of rubber which completely covers the strands of the cotton but fills only a part of each aperture between such strands.

5. A storage battery separator comprising coarsely woven cotton fabric provided with an exterior coating of vulcanized rubber which completely covers the strands of the fabric but fills only a part of each aperture between the strands.

6. The process of manufacturing a storage battery separator member which consists in dipping a fabric in rubber solution and vulcanizing or curing the same.

7. The process of manufacturing a storage battery separator member which consists in covering a coarsely woven cotton fabric with rubber that fills only a part of each aperture between the strands of the fabric.

8. A storage battery separator comprising a porous material having a single insulating acid resistant coating directly adherent thereto but leaving the apertures between the strands of such material open.

9. A storage battery separator consisting of a porous, filamentous material having its filaments coated with a single layer of an insulating, acid-resistant material which leaves open the apertures between the filaments.

10. A storage battery separator comprising a screen provided with a single exterior coating of insulating acid resistant material which leaves open the apertures between the strands of the screen.

In testimony whereof I affix my signature.

PAUL E. NORRIS.